US008031558B2

(12) United States Patent
Shin et al.

(10) Patent No.: US 8,031,558 B2
(45) Date of Patent: Oct. 4, 2011

(54) FORCED ACOUSTIC DIPOLE AND FORCED ACOUSTIC MULTIPOLE ARRAY USING THE SAME

(75) Inventors: Min Cheol Shin, Daejeon (KR); Sung Q Lee, Daejeon (KR); Sang Kyun Lee, Gwangju (KR); Hye Jin Kim, Daejeon (KR); Kang Ho Park, Dajeon (KR); Jong Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 315 days.

(21) Appl. No.: 12/473,214

(22) Filed: May 27, 2009

(65) Prior Publication Data

US 2010/0080085 A1 Apr. 1, 2010

(30) Foreign Application Priority Data

Sep. 30, 2008 (KR) ........................ 10-2008-0095758

(51) Int. Cl.
*H04B 1/02* (2006.01)

(52) U.S. Cl. ....................................................... 367/138

(58) Field of Classification Search .................. 367/138; 381/97

See application file for complete search history.

(56) References Cited

U.S. PATENT DOCUMENTS 5,802,190 A 9/1998 Ferren
5,870,484 A 2/1999 Greenberger
5,953,432 A 9/1999 Yanagawa et al.
6,650,758 B1 11/2003 Van Schyndel
2005/0221867 A1 10/2005 Zurek et al.
2010/0080085 A1* 4/2010 Shin et al. ..................... 367/138
2010/0124342 A1* 5/2010 Lee et al. ........................ 381/97

FOREIGN PATENT DOCUMENTS

JP 2004-349816 12/2004
KR 10-2007-0007325 A 1/2007

OTHER PUBLICATIONS

Marinus M. Boone et al., "Design of a Loudspeaker System with a Low-Frequency Cardioidlike Radiation Pattern," J. Audio Eng. Soc., Sep. 1997, pp. 702-707, vol. 45, No. 9.

Richard Greenfield et al., "Efficient Filter Design for Loudspeaker Equalization" Loudspeaker Equalization Filters, J. Audio Eng. Soc., Oct. 1991, pp. 739-751, vol. 39, No. 10.

Marinus M. Boone et al., "Design of a Loudspeaker System with a Low-Frequency Cardioidlike Radiation Pattern", J. Audio. Soc., Sep. 1997, pp. 702-707, vol. 45, No. 9.

* cited by examiner

*Primary Examiner* — Daniel Pihulic

(57) ABSTRACT

Provided is a forced acoustic dipole capable of regulating phases and acoustic pressures of first and second acoustic signals output from first and second pole speakers to freely steer the direction of an acoustic lobe. In addition, a forced acoustic multipole array is constituted by a plurality of forced acoustic dipoles. When the phases and acoustic pressures of the first and second acoustic signals output from the forced acoustic dipoles are regulated to steer an acoustic lobe in a specific direction, sound can be heard from a desired direction only without disturbing others.

11 Claims, 8 Drawing Sheets

FORCED ACOUSTIC DIPOLE AND FORCED ACOUSTIC MULTIPOLE ARRAY USING THE SAME

CROSS-REFERENCE TO RELATED APPLICATION

This application claims priority to and the benefit of Korean Patent Application No. 10-2008-0095758, filed Sep. 30, 2008, the disclosure of which is incorporated herein by reference in its entirety.

BACKGROUND

1. Field of the Invention

The present invention relates to a forced acoustic dipole and a forced acoustic multipole array using the same, and more particularly, to a forced acoustic dipole that is capable of freely steering the direction of an acoustic lobe and a forced acoustic multipole array using the same.

2. Discussion of Related Art

When a conventional speaker system is used to reproduce sound, the sound naturally radiates and can bother other people. In order to minimize the disturbance of others and protect privacy, personal acoustic systems such as headphones, earphones, and so on, are generally used. However, occlusion effect remains as a problem to be solved. Therefore, there is a need to minimize the disturbance of others and solve the problem of the occlusion effect.

One type of personal acoustic system, a line speaker array system, has been proposed to generate a directional lobe using a line speaker array.

The line speaker array system is configured to pass a sound signal through a digital filter, which is adjusted to have directionality, and output the sound signal for listeners to hear at a predetermined position.

However, since the line speaker array system should have filters attached to the speakers, increase in the number of speakers complicates the structure of the system, and spatial resolution of radio frequency is decreased to generate a side-lobe. In addition, since speaker arrangement should be lengthened in proportion to wavelength in order to control low-frequency sound, frequency should be confined to a controllable range for a limited length. In particular, since optimal directional characteristics depend on frequency due to the position of the fixed speakers, numerous filters are needed. In addition, in order to obtain optimal directional characteristics at each frequency, optimal filter coefficients should be calculated one by one.

In order to solve these problems, a speaker system having a simple structure using an acoustic dipole has recently been proposed. However, due to characteristics of the acoustic dipole, the direction of the speaker system's acoustic lobe where sound can be heard cannot be adjusted.

SUMMARY OF THE INVENTION

It is an object of the present invention to solve the aforementioned problems associated with conventional devices by providing a forced acoustic dipole that enables free adjustment of an acoustic lobe direction and a forced acoustic multipole array using the same.

According to one aspect of the present invention, a forced acoustic dipole includes: a phase converter for converting a phase of an input signal by a predetermined angle to output a first acoustic signal; a phase inverter for inverting a phase of the first acoustic signal to output a second acoustic signal; first and second acoustic pressure regulators for adjusting acoustic pressures of the first and second acoustic signals, respectively; first and second amplifiers for amplifying the acoustic pressure-adjusted first and second acoustic signals, respectively; first and second pole speakers for outputting the amplified first and second acoustic signals, respectively; and a sub steering part for adjusting a phase conversion angle of the phase converter or adjusting acoustic pressure levels of the first and second acoustic pressure regulators, to steer a direction of an acoustic lobe depending on the first and second acoustic signals output from the first and second pole speakers.

In the forced acoustic dipole in accordance with the present invention, the first and second acoustic signals output from the first and second pole speakers may be offset or amplified to steer the acoustic lobe in a specific direction depending on the first and second acoustic signals.

According to another aspect of the present invention, a forced acoustic multipole array includes: a plurality of forced acoustic dipoles arranged in a matrix; and a main steering part for adjusting phases or acoustic pressures of acoustic signals output from the forced acoustic dipoles to steer the entire acoustic lobe, wherein each of the forced acoustic dipoles includes a phase converter for converting a phase of an input signal by a predetermined angle to output a first acoustic signal, a phase inverter for inverting a phase of the first acoustic signal to output a second acoustic signal, first and second acoustic pressure regulators for adjusting acoustic pressures of the first and second acoustic signals, respectively, first and second amplifiers for amplifying the acoustic pressure-adjusted first and second acoustic signals, respectively, first and second pole speakers for outputting the amplified first and second acoustic signals, respectively, and a sub steering part for adjusting a phase conversion angle of the phase converter or adjusting acoustic pressure levels of the first and second acoustic pressure regulators, to steer a direction of an acoustic lobe depending on the first and second acoustic signals output from the first and second pole speakers.

In the forced acoustic multipole array in accordance with the present invention, the acoustic signals output from the forced acoustic dipoles may be offset or amplified to steer the acoustic lobe in a specific direction depending on the acoustic signals.

The main steering part may simultaneously adjust the phase conversion angle of the phase converter and the acoustic pressure levels of the first and second acoustic pressure regulators through the sub steering parts included in each of the forced acoustic dipoles such that acoustic signals having various phases and acoustic pressures are output from the forced acoustic dipoles.

BRIEF DESCRIPTION OF THE DRAWINGS

The above and other objects, features and advantages of the present invention will be better understood through the following description of certain exemplary embodiments thereof and the attached drawings, in which.

DETAILED DESCRIPTION OF EXEMPLARY EMBODIMENTS

The present invention will now be described more fully hereinafter with reference to the accompanying drawings, in which preferred embodiments of the invention are shown.

Figure 1:
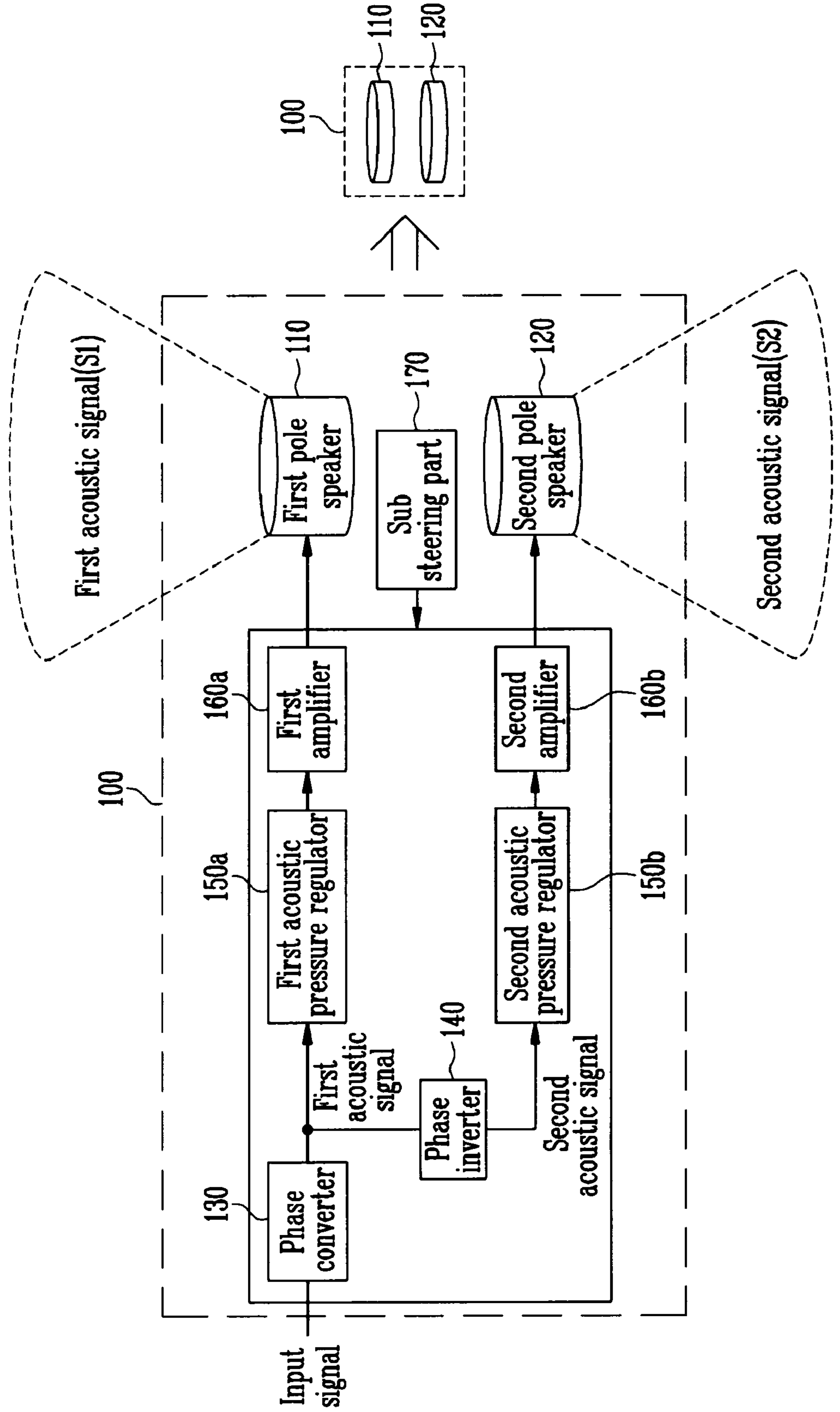
FIG. 1 is a block diagram of a forced acoustic dipole in accordance with an exemplary embodiment of the present invention.

FIG. 1 is a block diagram of a forced acoustic dipole 100 in accordance with an exemplary embodiment of the present invention.

Referring to FIG. 1, the forced acoustic dipole 100 in accordance with an exemplary embodiment of the present invention includes first and second pole speakers 110 and 120, a phase converter 130, a phase inverter 140, first and second acoustic pressure regulators 150*a* and 150*b*, first and second amplifiers 160*a* and 160*b*, and a sub steering part 170.

Here, the first and second pole speakers 110 and 120 may be implemented by acoustic devices such as voice coil motor speakers, piezoelectric speakers, supersonic transducers, and so on.

First, the phase converter 130 converts a phase of an input signal by a predetermined angle and outputs it, and the input signal phase-converted by a predetermined angle by the phase converter 130 is referred to as a first acoustic signal, for convenience.

The phase inverter 140 inverts the phase of the first acoustic signal and outputs it, and the first acoustic signal phase-inverted through the phase inverter 140 is referred to as a second acoustic signal, for convenience.

The first acoustic pressure regulator 150*a* regulates an acoustic pressure of the first acoustic signal and outputs it to the first amplifier 160*a*, and the first amplifier 160*a* amplifies the first acoustic signal and outputs it to the first pole speaker 110 so that the first acoustic signal S1 is output from the first pole speaker 110.

The second acoustic pressure regulator 150*b* regulates an acoustic pressure of the second acoustic signal and outputs it to the second amplifier 160*b*, and the second amplifier 160*b* amplifies the second acoustic signal and outputs it to the second pole speaker 120 so that the first acoustic signal S2 is output from the second pole speaker 120.

The sub steering part 170 appropriately adjusts a phase conversion angle of the phase converter 130, acoustic pressure levels of the first and second acoustic pressure regulators 150*a* and 150*b*, and gains of the first and second amplifiers 160*a* and 160*b* to steer the direction of the acoustic lobe depending on the first and second acoustic signals S1 and S2, which will be described hereinafter in detail.

That is, the forced acoustic dipole 100 in accordance with an exemplary embodiment of the present invention is an acoustic speaker configured to regulate phases and acoustic pressures of the first and second acoustic signals S1 and S2 output from the first and second pole speakers 110 and 120 through the phase converter 130 and the first and second acoustic pressure regulators 150*a* and 150*b*, to steer the direction of the acoustic lobe.

Figure 2:
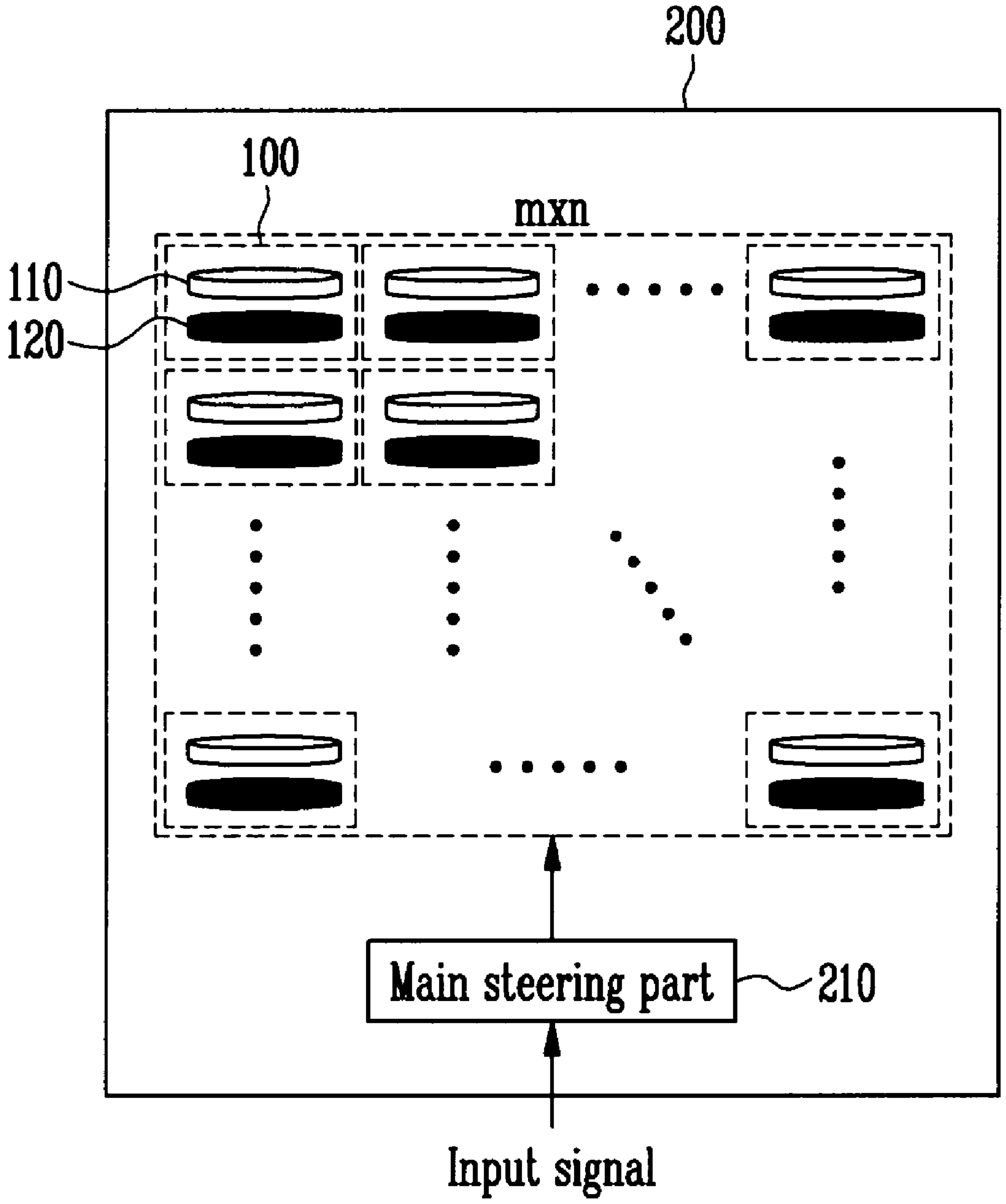
FIG. 2 is a view of a forced acoustic multipole array using a forced acoustic dipole in accordance with an exemplary embodiment of the present invention.

For convenience, the forced acoustic dipole 100 in accordance with an exemplary embodiment of the present invention will be simplified as shown on the right side of FIG. 2.

FIG. 2 is a view of a forced acoustic multipole array 200 using a forced acoustic dipole in accordance with an exemplary embodiment of the present invention.

Referring to FIG. 2, the forced acoustic multipole array 200 in accordance with an exemplary embodiment of the present invention has a structure in which a plurality of forced acoustic dipoles 100 are disposed in m rows and n columns (wherein m and n are integers not less than 1), and a main steering part 210 steers the direction of an acoustic lobe of each of the forced acoustic dipoles 100.

A method of steering the direction of the acoustic lobe using the main steering part 210 will be described below in detail.

First, the main steering part 210 adjusts a phase conversion angle of the phase converter 130 through the sub steering part 170 included in each of the forced acoustic dipoles 100 to output acoustic signals having various phases from the forced acoustic dipoles 100.

As a result, the acoustic signals output from the forced acoustic dipoles 100 are offset or amplified to steer the acoustic lobe in a specific direction such that sound can be heard in the specific direction only.

Second, the main steering part 210 adjusts acoustic pressure levels of the first and second acoustic pressure regulators 150*a* and 150*b* through the sub steering part 170 included in each of the forced acoustic dipoles 100 such that acoustic signals having various acoustic pressures are output from the forced acoustic dipoles 100.

As a result, the acoustic signals output from the forced acoustic dipoles 100 are offset or amplified to steer the acoustic lobe in a specific direction such that sound can be heard in the specific direction only.

A method of steering the direction of the acoustic lobe in the forced acoustic multipole array in accordance with an exemplary embodiment of the present invention will be described below in detail.

Figure 3A:
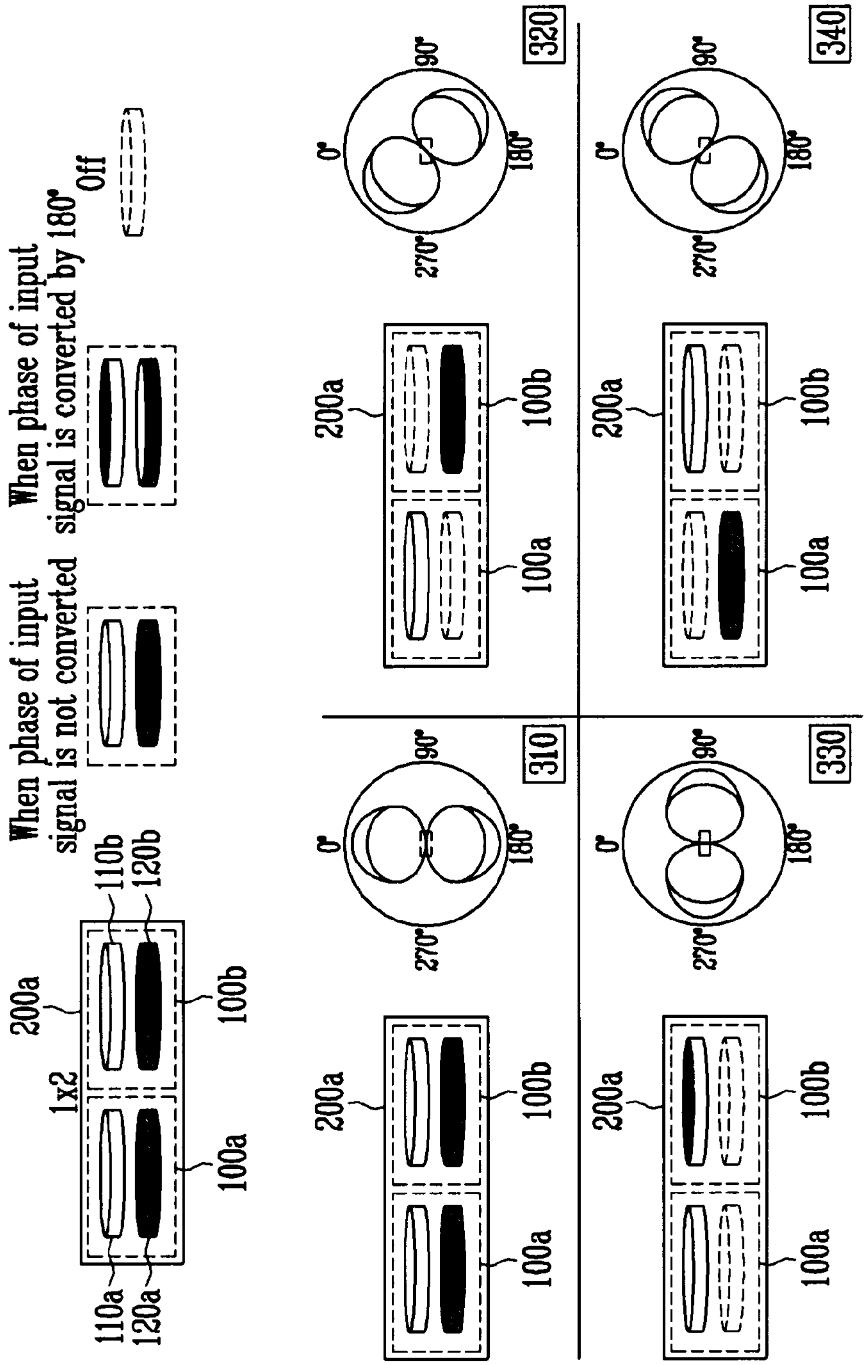
FIG. 3A is a view showing directions of acoustic lobes which may be represented when first and second forced acoustic dipoles are arranged in a single row and two columns to constitute a forced acoustic multipole array.

FIG. 3A is a view showing directions of acoustic lobes which may be represented when first and second forced acoustic dipoles 100*a* and 100*b* are arranged in a single row and two columns to constitute a forced acoustic multipole array 200*a*.

First, in the case that the phase of the input signal is not converted by the first and second forced acoustic dipoles 100*a* and 100*b*, when first and second pole speakers 110*a* and 120*a* of the first forced acoustic dipole 100*a* and first and second pole speakers 110*b* and 120*b* of the second forced acoustic dipoles 100*b* are turned ON, like the acoustic lobe designated by reference numeral 310, sound can only be heard from the front and back of the forced acoustic multipole array, not from the sides.

Here, the first pole speakers 110*a* and 110*b* and the second pole speakers 120*a* and 120*b* are turned ON/OFF by regulating acoustic pressure levels of the first and second acoustic pressure regulators (see FIG. 1), which will be similar in the following embodiments.

Second, in the case that the phase of the input signal is not converted by the first and second forced acoustic dipoles 100*a* and 100*b*, when the first pole speaker 110*a* of the first forced acoustic dipole 100*a* is turned ON and the second pole speaker 120*b* of the second forced acoustic dipole 100*b* is turned ON, an acoustic lobe designated by reference numeral 320 is formed.

Third, in the case that the phase of the input signal is not converted by the first forced acoustic dipole 100*a* and the phase of the input signal is converted by the second forced acoustic dipole 100*b*, when the first pole speaker 110*a* of the first forced acoustic dipole 100*a* is turned ON and the first pole speaker 110*b* of the second forced acoustic dipole 100*b* is turned ON, sound can be heard from left and right sides only, like reference numeral 330.

Fourth, in the case that the phase of the input signal is not converted by 180° by the first and second forced acoustic dipoles 100*a* and 100*b*, when the second pole speaker 120*a* of the first forced acoustic dipole 100*a* is turned ON and the first pole speaker 110*b* of the second forced acoustic dipole 100*b* is turned ON, an acoustic lobe designated by reference numeral 340 is formed.

Figure 3B:
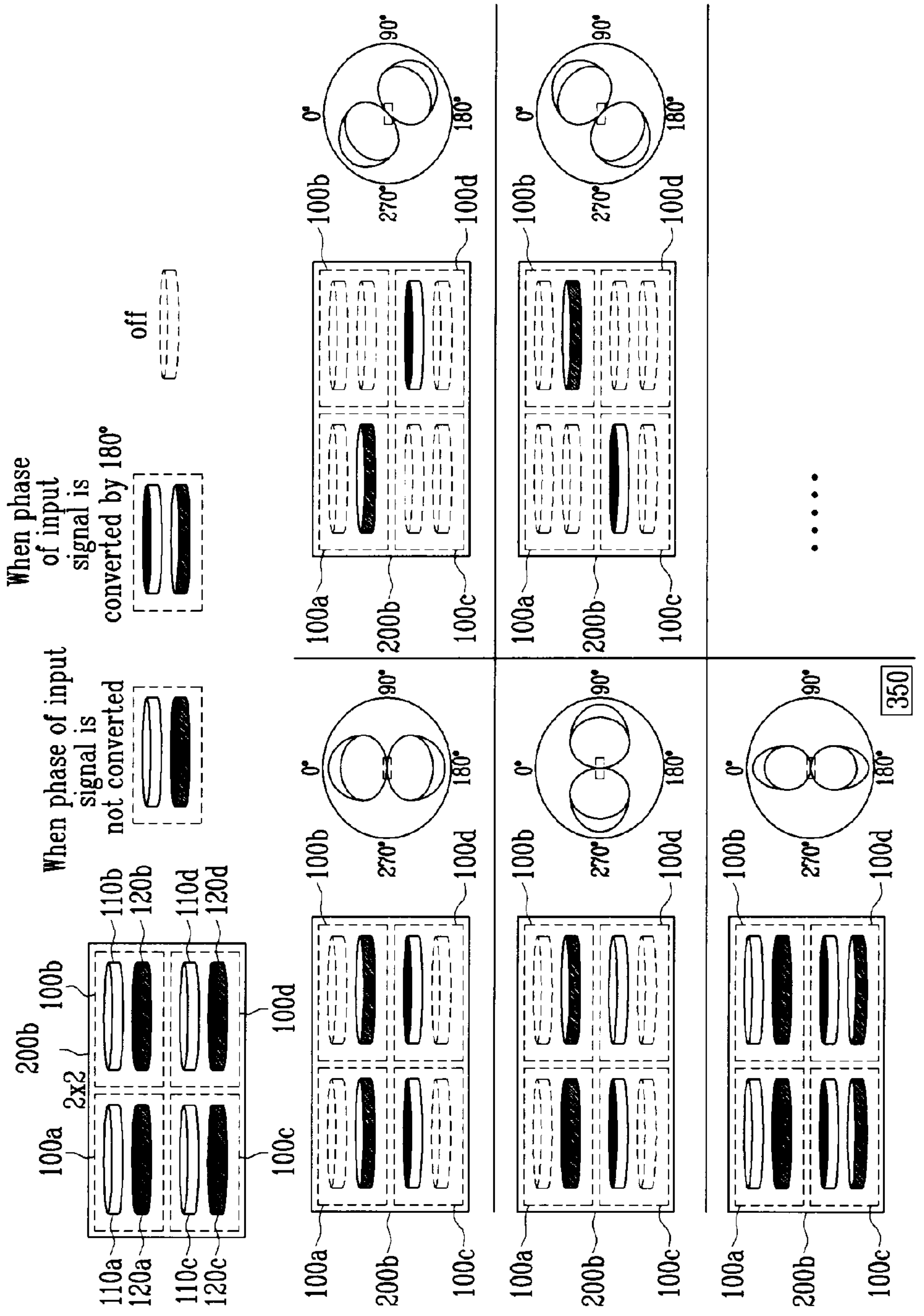
FIG. 3B is a view showing directions of acoustic lobes which may be represented when first to fourth forced acoustic dipoles are arranged in two rows and two columns to constitute a forced acoustic multipole array.

FIG. 3B is a view showing directions of acoustic lobes which may be represented when first to fourth forced acoustic dipoles 100*a* to 100*d* are arranged in two rows and two columns to constitute a forced acoustic multipole array 200*b*.

Referring to FIG. 3B, it will be appreciated that, while the direction of the acoustic lobe is varied similar to FIG. 3A, the width of the acoustic lobe designated by reference numeral 350 is narrower than that formed by the forced acoustic multipole array 200*a* with a single row and two columns.

Figure 3C:
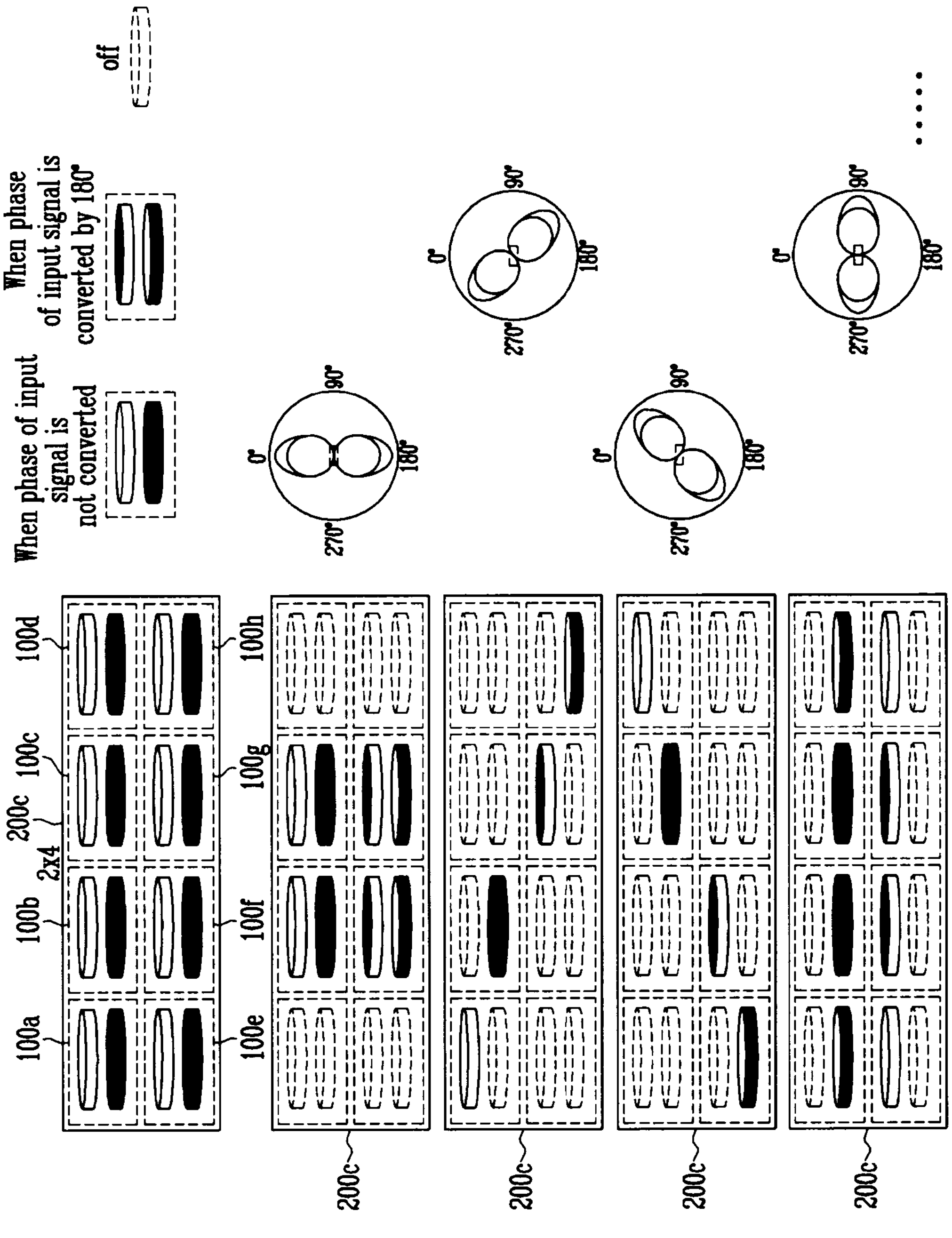
FIG. 3C is a view showing directions of acoustic lobes which may be represented when first to eighth forced acoustic dipoles are arranged in two rows and two columns to constitute a forced acoustic multipole array.

FIG. 3C is a view showing directions of acoustic lobes which may be represented when first to eighth forced acoustic dipoles 100*a* to 100*h* are arranged in two rows and two columns to constitute a forced acoustic multipole array 200*c*.

Referring to FIG. 3C, it will be appreciated that the acoustic lobe is steered in various directions in a state in which the width of the acoustic lobe has been narrowed.

As can be seen from the above embodiment, in the forced acoustic multipole array 200 constituted by a plurality of forced acoustic dipoles 100, it is possible to freely vary the direction and the width of the acoustic lobe by only regulating an acoustic pressure of an acoustic signal output from each of the forced acoustic dipoles 100 and converting the phase thereof by 180°.

While the embodiment has been described with reference to the case that the phase of the input signal is not converted or converted to 180 by each of the forced acoustic dipoles 100, as described above, it is possible to convert the phase of the input signal by various angles through the phase converter 130 included in each of the forced acoustic dipole 100 to output acoustic signals having various phases from the forced acoustic dipoles 100, which will be described below in detail.

Figure 4:
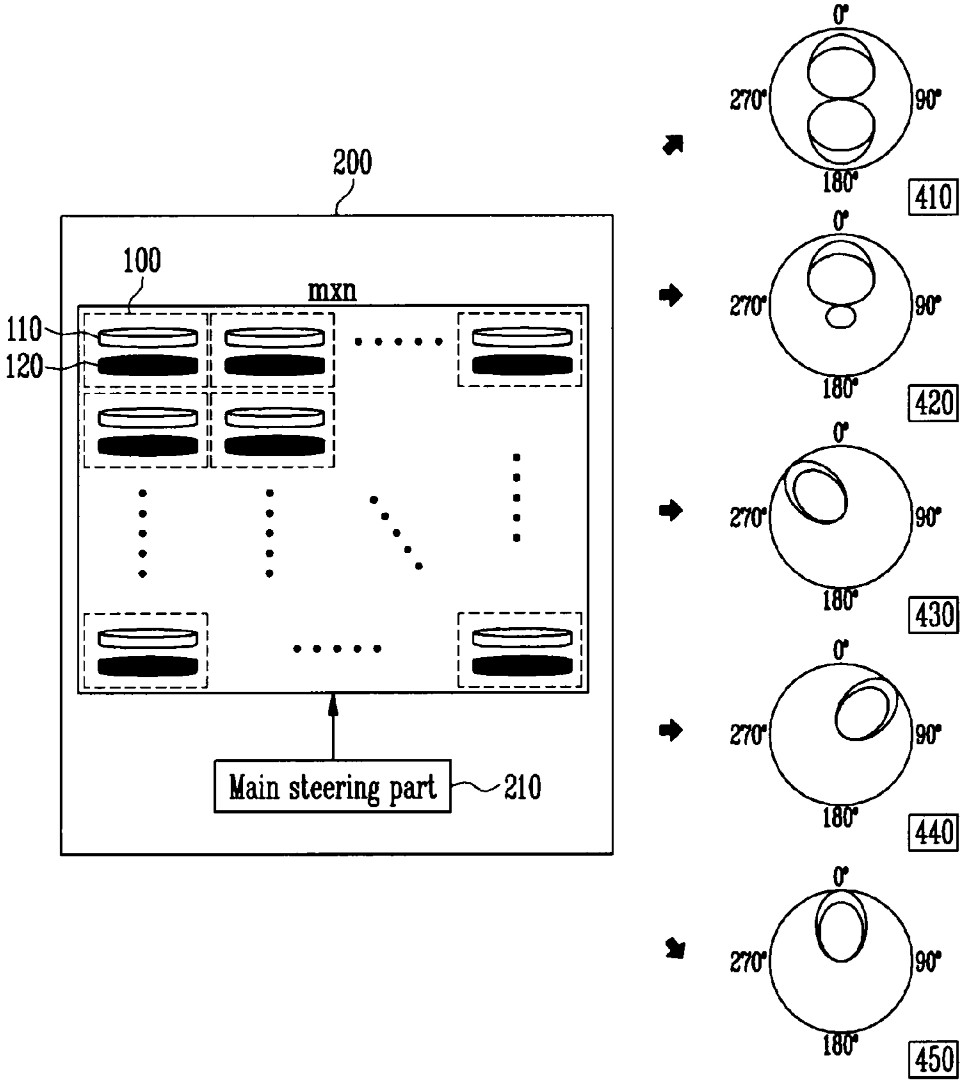
FIG. 4 is a view showing a direction of an acoustic lobe which may be represented by a forced acoustic multipole array in accordance with an exemplary embodiment of the present invention.

FIG. 4 is a view showing a direction of an acoustic lobe which may be represented by a forced acoustic multipole array 200 in accordance with an exemplary embodiment of the present invention.

Referring to FIG. 4, the forced acoustic multipole array 200 in accordance with an exemplary embodiment of the present invention outputs acoustic signals having various phases from the forced acoustic dipoles 100 through the main steering part 210 to appropriately regulate acoustic pressures of acoustic signals output from the forced acoustic dipoles 100.

As described above, when the phases and the acoustic pressures of the acoustic signals output from the forced acoustic dipoles 100 are appropriately and differently regulated, acoustic lobes in specific directions can be formed in addition to the acoustic lobe designated by reference numeral 410, as can be seen from FIGS. 3A to 3C. Thus, it is possible to more finely steer the direction of the acoustic lobe.

In addition, the forced acoustic multipole array 200 in accordance with an exemplary embodiment of the present invention can also overlap acoustic signals output from the forced acoustic dipoles 100 to generate an imaginary sound source, and thus, quality of various sound control services can be improved.

Figure 5:
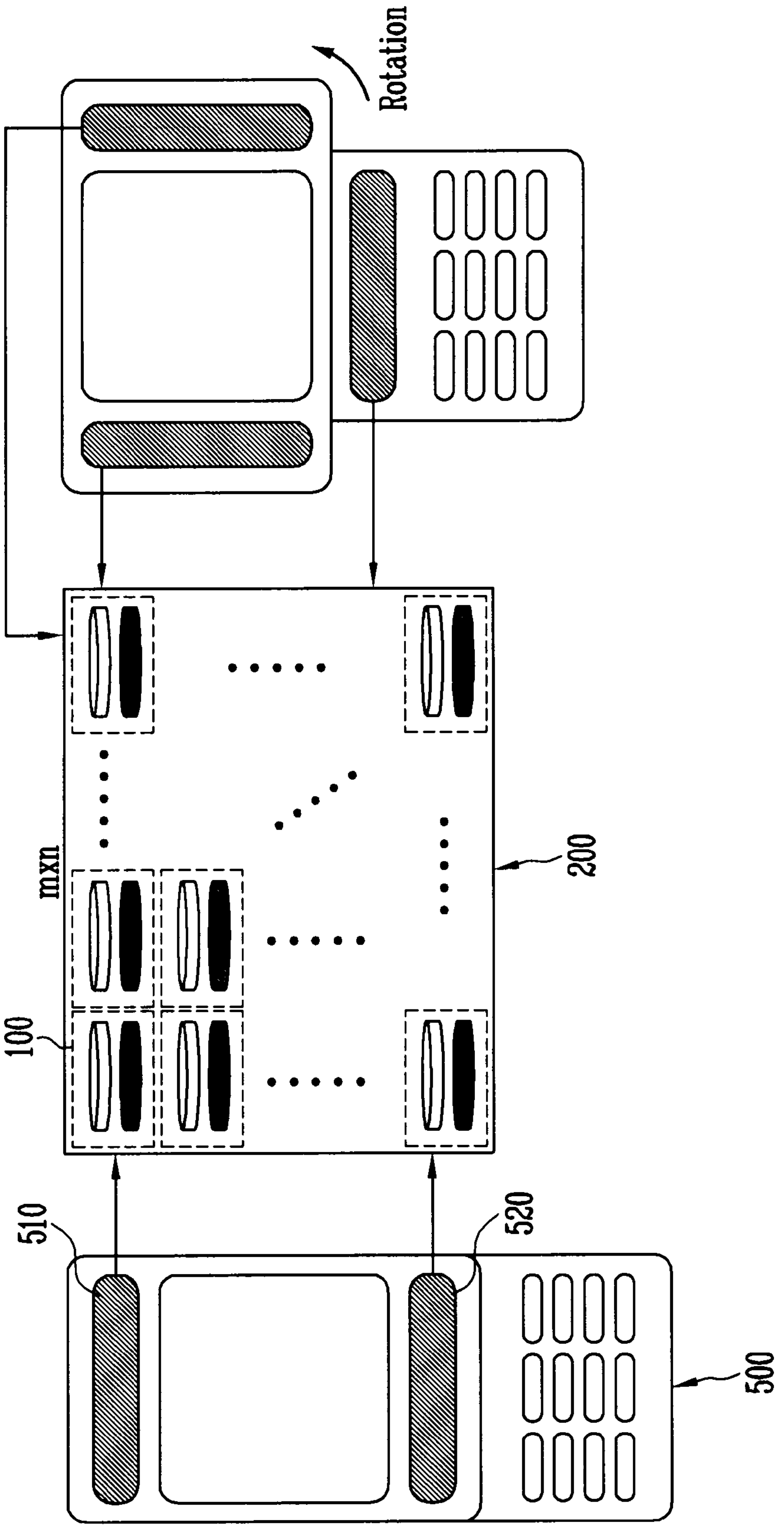
FIG. 5 is a view of a forced acoustic multipole array in accordance with an exemplary embodiment of the present invention which is adapted to a mobile communication terminal.

FIG. 5 is a view of a forced acoustic multipole array 200 in accordance with an exemplary embodiment of the present invention which is adapted to a mobile communication terminal 500.

Referring to FIG. 5, the mobile communication terminal 500 functions as a mobile information device for watching and hearing multimedia such as TV media in addition to making and receiving telephone calls. Since the mobile communication terminal 500 is likely to be used in crowded places such as subways, the direction of the acoustic lobe may be critical.

As shown in FIG. 5, when the forced acoustic multipole array 200 in accordance with an exemplary embodiment of the present invention is installed at upper and lower parts 510 and 520 of the mobile terminal 500, the direction of the acoustic lobe can be appropriately adjusted to reproduce sound without disturbing others.

Here, even though a liquid crystal display of the mobile terminal 500 is rotated so that the position of the forced acoustic multipole array 200 is changed, when the acoustic pressure and phase of the acoustic signal output from the forced acoustic multipole array 200 are appropriately adjusted, it is possible to obtain the same effect as before the rotation.

Figure 6:
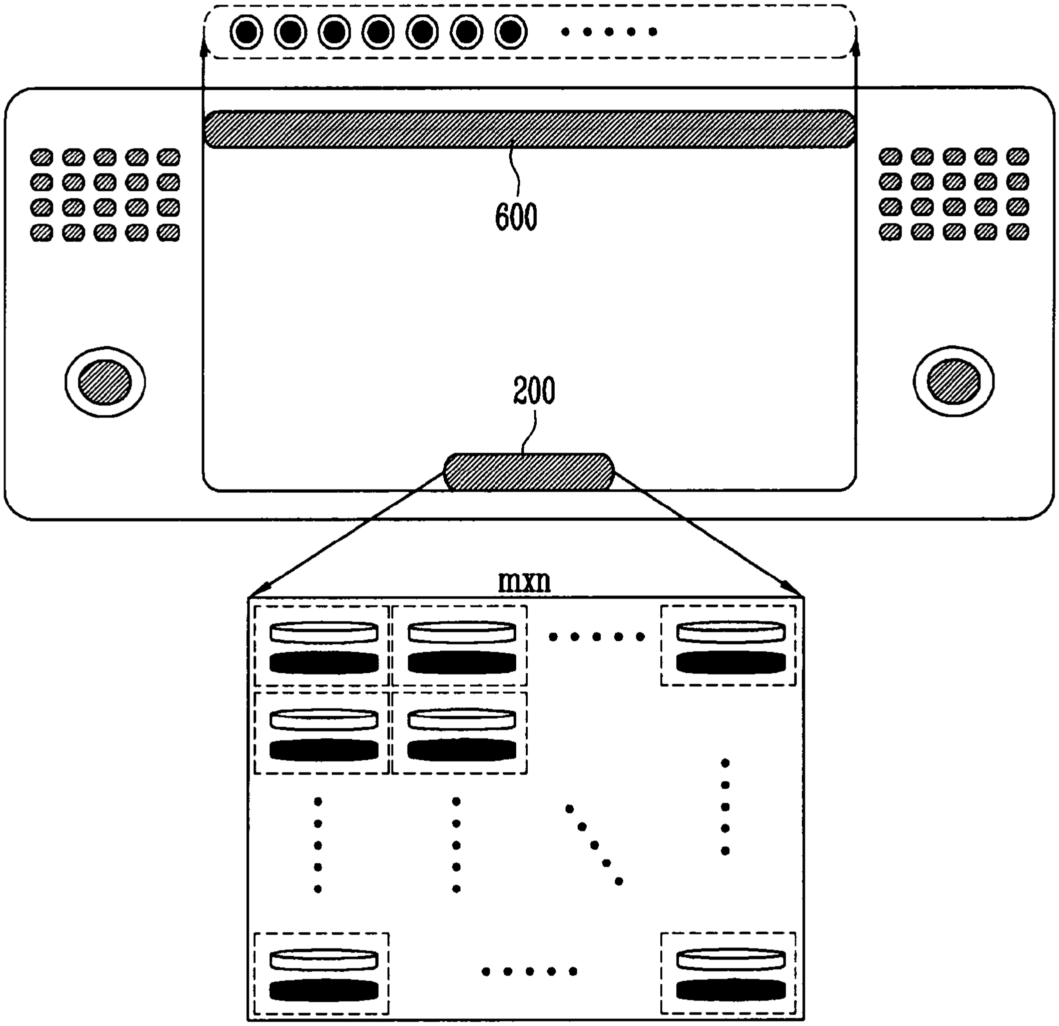
FIG. 6 is a schematic view of an acoustic system in which a forced acoustic multipole array in accordance with an exemplary embodiment of the present invention is coupled to a line speaker array.

FIG. 6 is a schematic view of an acoustic system in which a forced acoustic multipole array 200 in accordance with an exemplary embodiment of the present invention is coupled to a line speaker array 600.

Referring to FIG. 6, in a low frequency band, the direction of the acoustic lobe is controlled using the forced acoustic multipole array 200 in accordance with an exemplary embodiment of the present invention as a speaker. In a high frequency band, the direction of the acoustic lobe is controlled using the line speaker array 600 based on a time delay algorithm (TDA).

As described above, when the direction of the acoustic lobe is controlled using the forced acoustic multipole array 200 in a low frequency band, it is possible to overcome degradation of acoustic directionality in the low frequency region and the acoustic directionality varies with the length of the line.

As can be seen from the foregoing, since an acoustic pressure and phase of an acoustic signal output from a forced acoustic dipole can be regulated to freely steer the direction of an acoustic lobe, it is possible to hear sound in a desired range only.

In addition, it is possible for a small device such as a mobile terminal to provide vivid acoustic effects without disturbing others. Further, it is possible to couple with other sound reproduction apparatuses to improve sound reproduction performance.

Although the present invention has been described with reference to certain exemplary embodiments thereof, it will be understood by those skilled in the art that a variety of modifications may be made to the exemplary embodiments without departing from the spirit or scope of the present invention defined by the appended claims and their equivalents.

What is claimed is:

1. A forced acoustic dipole comprising:

a phase converter for converting a phase of an input signal by a predetermined angle to output a first acoustic signal;

a phase inverter for inverting a phase of the first acoustic signal to output a second acoustic signal;

first and second acoustic pressure regulators for adjusting acoustic pressures of the first and second acoustic signals, respectively;

first and second amplifiers for amplifying the acoustic pressure-adjusted first and second acoustic signals, respectively;

first and second pole speakers for outputting the amplified first and second acoustic signals, respectively; and a sub steering part for adjusting a phase conversion angle of the phase converter or adjusting acoustic pressure levels of the first and second acoustic pressure regulators, to steer a direction of an acoustic lobe depending on the first and second acoustic signals output from the first and second pole speakers.

2. The forced acoustic dipole according to claim 1, wherein the first and second acoustic signals output from the first and second pole speakers are offset or amplified to steer the acoustic lobe in a specific direction depending on the first and second acoustic signals.

3. The forced acoustic dipole according to claim 1, wherein the sub steering part simultaneously adjusts the phase conversion angle of the phase converter and the acoustic pressure levels of the first and second acoustic pressure regulators.

4. The forced acoustic dipole according to claim 1, wherein the sub steering part adjusts gains of the first and second amplifiers, respectively.

5. The forced acoustic dipole according to claim 1, wherein the first and second pole speakers are any one type selected from voice coil motor speakers, piezoelectric speakers, and supersonic transducers.

6. A forced acoustic multipole array comprising:

a plurality of forced acoustic dipoles arranged in a matrix; and a main steering part for adjusting phases or acoustic pressures of acoustic signals output from the forced acoustic dipoles to steer the entire acoustic lobe, wherein each of the forced acoustic dipoles includes a phase converter for converting a phase of an input signal by a predetermined angle to output a first acoustic signal, a phase inverter for inverting a phase of the first acoustic signal to output a second acoustic signal, first and second acoustic pressure regulators for adjusting acoustic pressures of the first and second acoustic signals, respectively, first and second amplifiers for amplifying the acoustic pressure-adjusted first and second acoustic signals, respectively, first and second pole speakers for outputting the amplified first and second acoustic signals, respectively, and a sub steering part for adjusting a phase conversion angle of the phase converter or adjusting acoustic pressure levels of the first and second acoustic pressure regulators, to steer a direction of an acoustic lobe depending on the first and second acoustic signals output from the first and second pole speakers.

7. The forced acoustic multipole array according to claim 6, wherein the acoustic signals output from the forced acoustic dipoles are offset or amplified to steer the acoustic lobe in a specific direction depending on the acoustic signals.

8. The forced acoustic multipole array according to claim 6, wherein the main steering part adjusts the phase conversion angle of the phase converter through the sub steering part included in each of the forced acoustic dipoles such that acoustic signals having various phases are output from the forced acoustic dipoles.

9. The forced acoustic multipole array according to claim 6, wherein the main steering part adjusts acoustic pressure levels of the first and second acoustic pressure regulators through the sub steering part included in each of the forced acoustic dipoles such that acoustic signals having various acoustic pressures are output from the forced acoustic dipoles.

10. The forced acoustic multipole array according to claim 6, wherein the main steering part simultaneously adjusts the phase conversion angle of the phase converter and the acoustic pressure levels of the first and second acoustic pressure regulators through the sub steering parts included in each of the forced acoustic dipoles such that acoustic signals having various phases and acoustic pressures are output from the forced acoustic dipoles.

11. The forced acoustic multipole array according to claim 6, wherein the forced acoustic multipole array is used for a speaker of a mobile device or a low frequency band speaker of a sound system.

* * * * *